Figure 1:
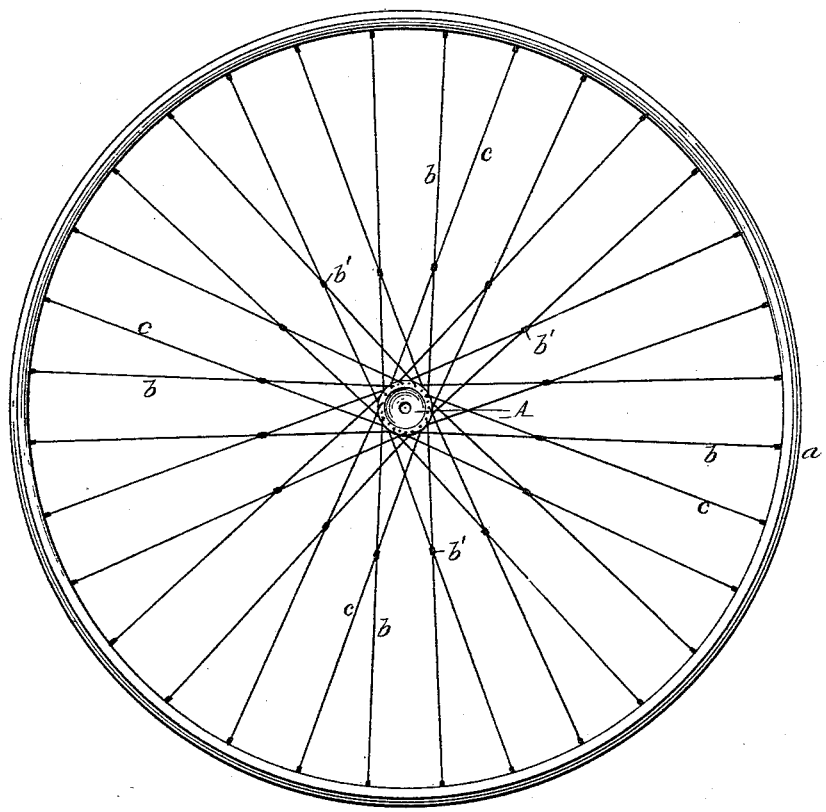

(No Model.) 2 Sheets—Sheet 1.

E. G. LATTA.
WHEEL.

No. 457,494. Patented Aug. 11, 1891.

Witnesses:
Emil Neuhart
Theo. L. Popp

E. G. Latta Inventor.
By Wilhelm Bonner
Attorneys.

(No Model.) 2 Sheets—Sheet 2.
E. G. LATTA.
WHEEL.
No. 457,494. Patented Aug. 11, 1891.
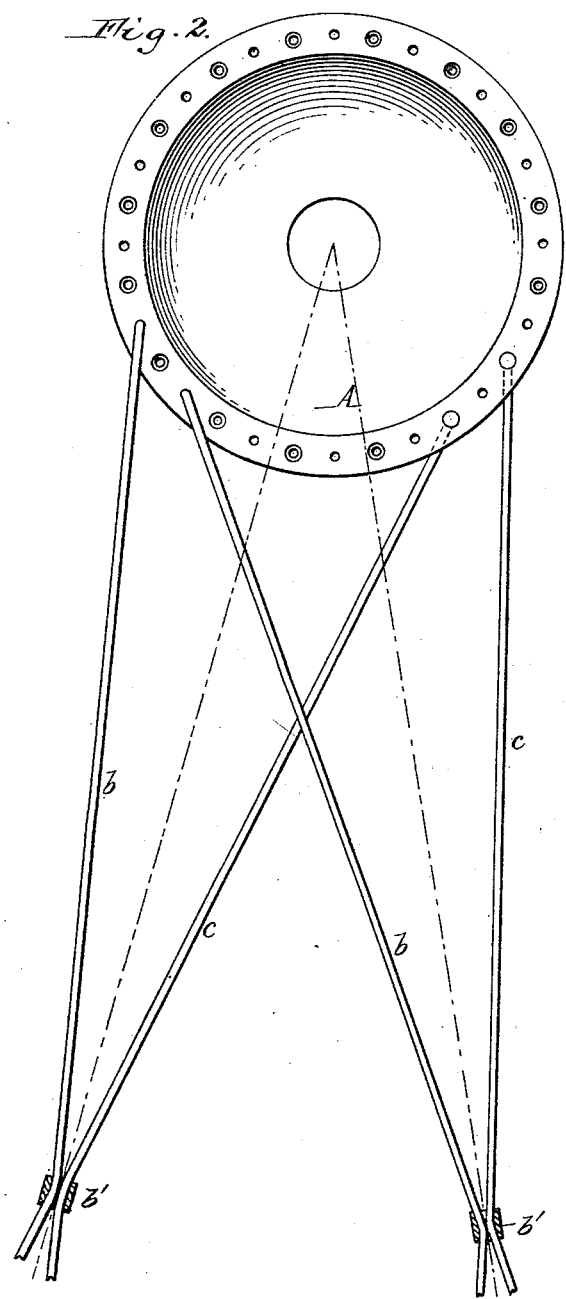

UNITED STATES PATENT OFFICE.

EMMIT G. LATTA, OF FRIENDSHIP, NEW YORK.

WHEEL.

SPECIFICATION forming part of Letters Patent No. 457,494, dated August 11, 1891.

Application filed January 29, 1891. Serial No. 379,482. (No model.)

*To all whom it may concern:*

Be it known that I, EMMIT G. LATTA, a citizen of the United States, residing at Friendship, in the county of Allegany and State of New York, have invented new and useful Improvements in Wheels, of which the following is a specification.

This invention relates to that class of wheels which are particularly designed for use in velocipedes.

The object of my invention is to improve the construction of the wheel, so as to distribute the strains upon the spokes more equally, as will be hereinafter more fully described, and pointed out in the claims.

In the accompanying drawings, consisting of two sheets, Figure 1 is a side elevation of my improved wheel. Fig. 2 is a fragmentary sectional elevation of the same on an enlarged scale.

Like letters of reference refer to like parts in both figures.

A represents the flange of a wheel-hub, and $a$ the rim of the wheel.

$b$ represents a series of spokes extending from the outer face of the hub-flange to the rim, and $c$ a series of spokes extending from the inner face of the hub-flange to the rim at a different angle from the spokes of the opposite series. The spokes are loosely connected together in pairs between the hub-flange and the wheel-rim by loops or couplings $b'$, the spokes of each pair being on opposite sides of a radial line passing midway between the two spokes, as represented in Fig. 2, so that the spokes converge from the hub toward the coupling-sleeve and diverge from the latter toward the rim without crossing each other. The strain exerted upon either spoke of a pair is transmitted to the other spoke through the coupling and thence to the ends of said spokes. It will be observed that although the spokes resemble what are commonly known as "tangent" spokes they essentially differ from the latter, in that the spokes of each pair do not cross each other, but are brought against each other in the same plane at a point between the hub-flange and wheel-rim. By this arrangement the spokes lying in the same plane at their contact-surfaces offer less resistance to the air than a wheel having tangent spokes, and permit the wheel to revolve with practically the same freedom as a direct or radial spoke wheel, and the strain received by one spoke of a pair is shared by the other spoke, thereby not only rendering the spokes less liable to be broken by accident, but dividing the driving strain and causing both sets of spokes to perform equally the service which in the case of tangent spokes is performed, principally, by one set only. This causes the spokes to wear longer and renders them less liable to break when new. If desired, the spokes crossing each other inside of the coupling-sleeve $b'$ may be secured together; but as the hub-flange separates the two sets of spokes they are preferably disconnected. The coupling-sleeves may be placed nearer to the hub-flange than shown in the drawings, if desired. The angle of the spokes will vary with different-sized wheels or with wheels of the same size having a different number of spokes or a different-sized hub-flange. In a wheel with a given number of spokes the angle of the latter may be changed by connecting the spokes to the flange at different distances from the radial line. The spokes are attached to the hub-flange and wheel-rim in any ordinary manner.

I claim as my invention—

1. The combination, with the hub and the rim of a wheel, of spokes extending in pairs from the hub to the rim, the spokes of each pair being on opposite sides of a radial line passing between the spokes and connected together between the hub and the rim near said radial line without crossing each other, substantially as set forth.

2. The combination, with the hub and the rim of a wheel, of spokes extending in pairs from the hub to the rim, the spokes of each pair being on opposite sides of a radial line passing between the spokes and converging from the hub toward said radial line and diverging from the radial line toward the rim without crossing each other, and a loop or coupling connecting the spokes at their contiguous portions, substantially as set forth.

Witness my hand this 3d day of December, 1890.

EMMIT G. LATTA.

Witnesses:
JNO. J. BONNER,
FRED. C. GEYER.